United States Patent [19]
DeLellis et al.

[11] Patent Number: 5,934,404
[45] Date of Patent: Aug. 10, 1999

[54] RACK AND PINION STEERING SYSTEM FOR SOLID FRONT AXLE

[75] Inventors: Louis D. DeLellis, South Lyon; Robert M. Kuhn, Temperance, both of Mich.

[73] Assignee: Chrysler Corporation, Auburn Hills, Mich.

[21] Appl. No.: 08/823,765

[22] Filed: Mar. 24, 1997

[51] Int. Cl.⁶ .................................................... B62D 5/06
[52] U.S. Cl. ............................................ 180/436; 180/439
[58] Field of Search ................................ 180/417, 427, 180/428, 436, 437, 438, 439, 440

[56] References Cited

U.S. PATENT DOCUMENTS

| | | | |
|---|---|---|---|
| 1,657,412 | 1/1928 | Schneider | 180/436 |
| 3,426,863 | 2/1969 | Hanson | 180/439 |
| 4,475,615 | 10/1984 | Stanek | 180/436 |
| 4,488,615 | 12/1984 | Millard | 180/436 |

*Primary Examiner*—Kevin Hurley
*Attorney, Agent, or Firm*—James R. Yee

[57] ABSTRACT

A rack and pinion steering system for a sport utility vehicle having a solid front axle includes a pinion gear connected to the steering column of the vehicle and a rack gear meshed with the pinion gear. A coupling segment is moved by the engagement segment, and an arm is connected to the coupling segment. A drag link in turn is connected to the arm and is coupled to a first front wheel of the vehicle. Also, a tie rod couples the first front wheel to the second front wheel of the vehicle. With this structure, rotation of the pinion gear by the steering column causes the rack gear and arm to move translationally, thereby moving the drag link to turn the first front wheel. The first front wheel cooperates with the tie rod to simultaneously turn the second front wheel.

10 Claims, 2 Drawing Sheets

RACK AND PINION STEERING SYSTEM FOR SOLID FRONT AXLE

FIELD OF INVENTION

The present invention relates generally to vehicle steering systems, and more particularly to rack and pinion steering systems for vehicles with solid front axles.

BACKGROUND OF THE INVENTION

Many sport utility vehicles that are intended for off-road use incorporate solid front axles for improved performance over rocky terrain. It happens that the steering systems in vehicles that have solid front axles typically use recirculating ball systems instead of rack and pinion systems, because conventional rack and pinion systems, in which the rack is coupled at respective ends to the front tires, do not function as well as might be hoped when used in conjunction with a solid front axle.

It further happens that while recirculating ball steering systems are effective, rack and pinion steering systems are less costly than recirculating ball steering systems. Moreover, rack and pinion systems give the driver of a vehicle a better "feel" compared to recirculating ball steering systems. With these considerations in mind, the present invention recognizes a need to provide a rack and pinion steering system in a vehicle that has a solid front axle.

Accordingly, it is an object of the present invention to provide a rack and pinion steering system for a vehicle having a solid front axle. Another object of the present invention is to provide a rack and pinion steering system for a vehicle having a solid front axle in which the rack is coupled to a wheel at only one end of the rack. Still another object of the present invention is to provide a rack and pinion steering system for a vehicle having a solid front axle which is easy to use and cost-effective.

SUMMARY OF THE INVENTION

A steering system for a vehicle is disclosed that has a solid front axle and a steering column that includes a pinion gear connected to the steering column and rotatable therewith. A steering drive mechanism includes a rack gear meshed with the pinion gear at an engagement segment of the rack gear, and a coupling segment is moved by the engagement segment. In accordance with the present invention, an arm is connected to the coupling segment, and a drag link is connected to the arm. The drag link is coupled to a first front wheel of the vehicle, and a tie rod is coupled to the first front wheel and to a second front wheel of the vehicle. With this structure, rotation of the pinion gear causes the steering drive mechanism and arm to move translationally, thereby moving the drag link to turn the first front wheel. Also, the first front wheel cooperates with the tie rod to simultaneously turn the second front wheel.

In a preferred embodiment, a piston is engaged with the steering drive mechanism and a cylinder surrounds the piston. The cylinder includes hydraulic ports on opposite sides of the piston for receiving hydraulic lines to assist translational movement of the steering drive mechanism.

As disclosed further below, the cylinder includes first and second channels spaced from each other, and the steering drive mechanism further includes first and second guide rails reciprocatingly engaged with the first and second channels, respectively, and with the arm. The guide rails bear bending moments when the steering drive mechanism is moved.

Preferably, a ball joint couples the arm to the drag link. Also, in the presently preferred embodiment the arm includes a link segment that is distanced from the coupling segment, and the link segment is connected to the drag link. As intended herein, the arm is disposed near the second front wheel of the vehicle, such that the drag link extends nearly completely across the vehicle to the first front wheel.

In another aspect, a vehicle includes a steering column, first and second front wheels, and a tie rod interconnecting the wheels, such that when one wheel turns, the other wheel turns. An elongated drag link defines a wheel end and a mechanism end, with the wheel end of the drag link being coupled to the first wheel and the mechanism end of the drag link being disposed near the second wheel. A steering mechanism is coupled to the steering column. Per the present invention, the steering mechanism includes a rack gear having a pinion end engaged with a pinion gear and a drag link end coupled to the mechanism end of the drag link. With this structure, the steering mechanism is coupled to the wheels only at one end of the steering mechanism, and the pinion gear is rotatable by the steering column.

In yet another aspect, a method for turning first and second front wheels of a vehicle including a steering column includes coupling a pinion gear to the steering column, such that rotation of the steering column causes rotation of the pinion gear. The method also includes engaging the pinion gear with a rack gear, and coupling an arm end of the rack gear with the first wheel, such that rotation of the pinion gear causes the rack gear to move translationally and to thereby turn the first wheel. Further, the method includes coupling the first wheel to the second wheel such that when the first wheel turns, the second wheel turns.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
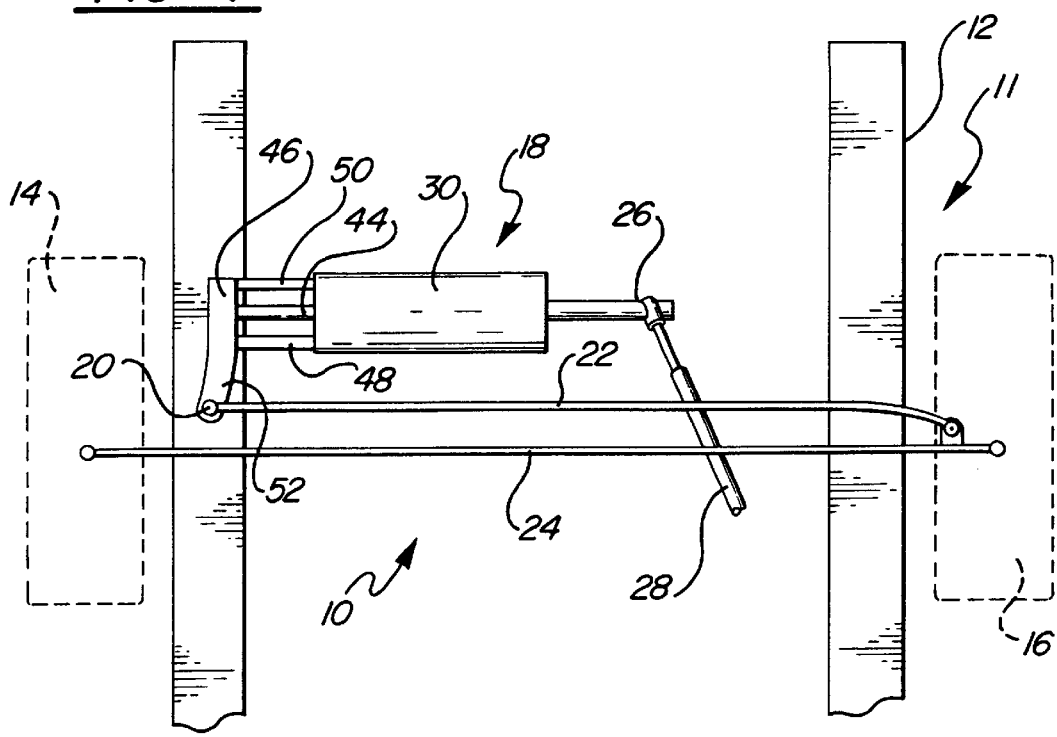
FIG. 1 is a bottom view of portions of a vehicle incorporating the steering system of the present invention, with the front wheels shown in phantom.

Referring initially to FIG. 1, a steering system is shown, generally designated 10, in combination with a vehicle, generally designated 11, that includes a chassis 12 and left and right front wheels 14, 16. In the preferred embodiment, the vehicle 11 includes a solid front axle, to improve the off-road handling of the vehicle 11.

As shown in FIG. 1, the system 10 includes a steering drive mechanism, generally designated 18, that is coupled by a left end ball joint 20 to an elongated rigid steel drag link 22. In turn, the drag link 22 extends transversely across the vehicle 11, and the drag link 22 is coupled to the knuckle of the right front wheel 16 by connector means known in the art. Additionally, the right front wheel 16 is coupled to the left front wheel 14 by an elongated rigid steel tie rod 24. Accordingly, when the right front wheel 16 turns, the tie rod 24 moves to turn the left front wheel 14 simultaneously with the turning of the right front wheel 16. It is to be understood that by "turn", the present invention means the pivoting of a wheel about an axis that is perpendicular to the rotational axis of the wheel.

Furthermore, the steering drive mechanism 18 is coupled at a right end 26 thereof to a steering column 28 of the vehicle 11. As disclosed more fully below, when the steering column is turned by an operator of the vehicle 11, the steering drive mechanism 18 is caused to move the drag link 22, thereby turning the right front wheel 16 and, hence, the left front wheel 14 to turn the vehicle 11 as desired by the operator.

Figure 2:
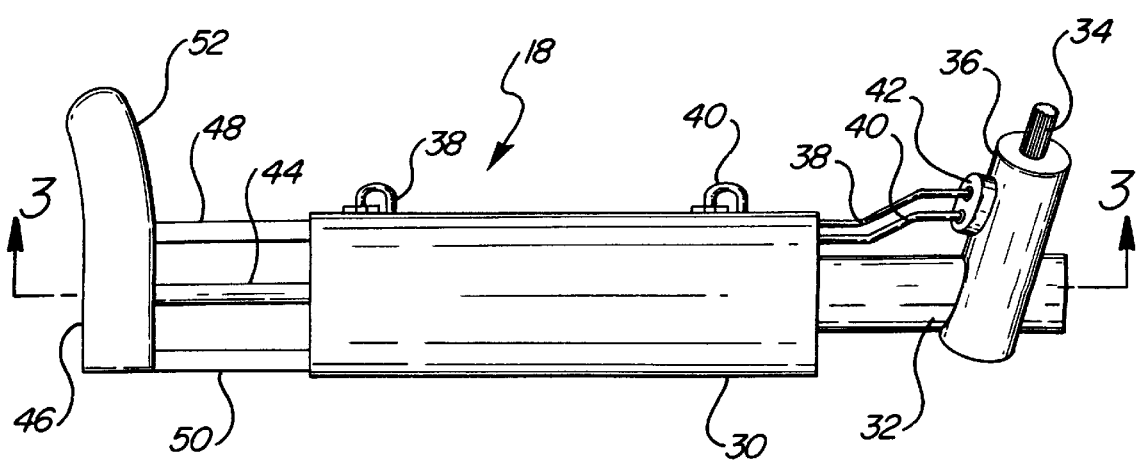
FIG. 2 is a perspective view of the steering drive mechanism.

FIG. 2 shows details of the steering drive mechanism 18. The mechanism 18 includes a hollow steel cylinder 30 and a hollow steel rack gear housing 32 that is connected to the cylinder 30. A steering column pinion shaft 34 is configured for engagement with the steering column 28 shown in FIG. 1, and the pinion shaft 34 rotates within a hollow shaft housing 36. In turn, the shaft housing 36 is connected to or formed integrally with the rack gear housing 32. Additionally, two metal hydraulic lines 38, 40 extend from a hydraulic hub 42 on the shaft housing 36 to the cylinder 30 as shown.

Moving to the end of the steering drive mechanism 18 that is opposite to the pinion shaft housing 36, a rigid steel coupling segment 44 is slidably disposed in the cylinder 30, and as shown in FIG. 2 the coupling segment 44 protrudes beyond the cylinder 30. As also shown, the coupling segment 44 is connected, preferably via a ball joint connection, to a rigid steel arm 46. In addition, rigid steel rear and front guide rails 48, 50 are slidably engaged with the cylinder 30, and the guide rails 48, 50 are connected to the arm 46. Preferably, the guide rails 48, 50 are threaded into the arm 46. In cross-reference to FIGS. 1 and 2, the arm 46 includes a link segment 52 that extends rearwardly beyond the rear guide rail 48, with the link segment 52 being connected near its end to the drag link 22 via the left end ball joint 20 (FIG. 1) as described above.

Figure 3:
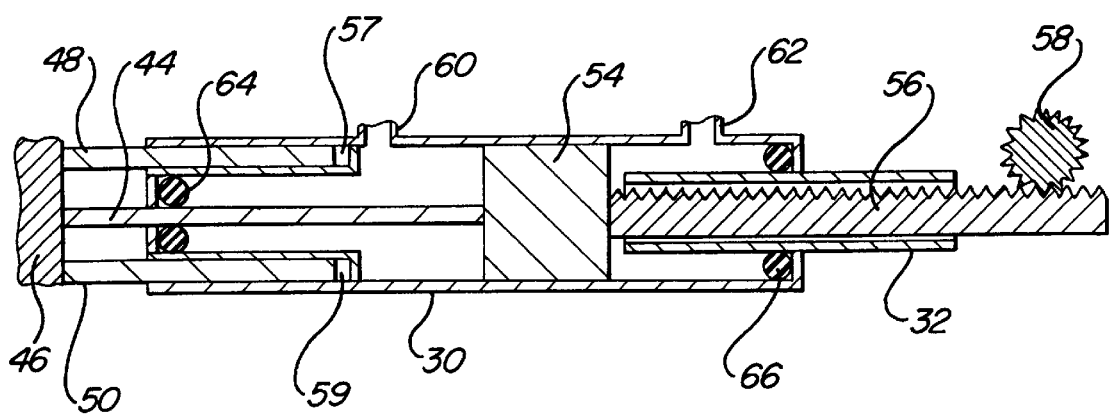
FIG. 3 is a cross-sectional view as seen along the line 3—3 in FIG. 2.

Now referring to FIGS. 2 and 3, a piston 54 is reciprocatingly disposed in the cylinder 30. A rack gear 56 is connected to the piston 54, and the rack gear 56 reciprocates within the rack gear housing 32. Moreover, a pinion gear 58 meshes with the rack gear 56, it being understood that the pinion gear 58 is connected to the steering column pinion shaft 34 (FIG. 2). Consequently, rotation of the shaft 34 causes the pinion gear 58 to rotate, thereby causing the rack gear 56 and, hence, piston 54 to move translationally. In other words, the rack gear 56 is coupled, via the piston 54, coupling segment 44, arm 46, and drag link 22 to the right wheel 16.

As shown in FIG. 3, the piston 54 is connected to the coupling segment 44. It may now be appreciated that when the pinion gear 58 moves the rack gear 56 and piston 54, the coupling segment 44 also moves translationally. In turn, as can be appreciated in cross-reference to FIGS. 2 and 3, the arm 46 also moves translationally, such that the drag link 22 shown in FIG. 1 moves to turn the right wheel 16 and, through the tie rod 24, the left wheel 14 as well. Also, the guide rails 48, 50 are slidably disposed in respective channels 57, 59 in the cylinder 30. Because the guide rails 48, 50 are connected to the arm 46, when the arm 46 moves translationally, so do the guide rails 48, 50.

As contemplated by the present invention, the above-described operation of the rack and pinion system can be hydraulically assisted to thereby establish a power steering system. Specifically, the hydraulic lines 38, 40 shown in FIG. 2 can be connected to respective ports 60, 62 that are formed in the cylinder 30, between which ports 60, 62 the piston 54 reciprocates. When the steering column is turned, hydraulic fluid is supplied by means well-known in the art to an appropriate one of the ports 60, 62, while the opposite port 62, 60 is vented, to thereby urge the piston 54 toward the direction it is being driven by the rack gear 56. If desired, appropriate seals can be provided in the cylinder 30, such as seals 64, 66. The seals 64, 66 can be, e.g., o-rings or other appropriate hydraulic seal. Other seals can be provided as appropriate to prevent hydraulic fluid from leaking out of the cylinder 30.

Referring back to FIG. 1, the advantageous operation of the present system 10 can be appreciated. Only one end of the rack gear 56 is coupled, via the piston 54, coupling segment 44, and arm 46, to the drag link 22. Further, the point at which the coupling is effected is nearer one side of the vehicle 11 than the other side. Consequently, the drag link 22 is long, and advantageously is not connected to the front wheel nearest the arm 46 (in the embodiment shown, the left wheel 14), but rather to the front wheel furthest from the arm 46 (the right wheel 16). With this cooperation of structure, the steering characteristics of the vehicle 11 are promoted.

Still further, it may now be recognized that the guide rails 48, 50 stabilize the steering drive mechanism 18. More particularly, the guide rails 48, 50 absorb bending moments in the coupling segment 44, and prevent overloading the seals 64, 66.

While the particular RACK AND PINION STEERING SYSTEM FOR SOLID FRONT AXLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A steering system for a vehicle having a solid front axle and a steering column, comprising:

first and second front wheels rotationally connected to the solid front axle:

a pinion gear connected to the steering column and rotatable therewith;

a steering drive mechanism including a rack gear meshed with the pinion gear at an engagement segment of the rack gear and a coupling segment moved by the engagement segment;

an arm connected to the coupling segment, the arm located on the second front wheel side of the solid front axle;

a drag link connected to the arm and coupled to the first front wheel of the vehicle, the drag link transversely crossing the solid front axle from the arm to the first front wheel; and a tie rod coupled to the first front wheel and to the second front wheel of the vehicle, whereby rotation of the pinion gear causes the steering drive mechanism and arm to move translationally, thereby moving the drag link to turn the first front wheel, the first front wheel cooperating with the tie rod to simultaneously turn the second front wheel.

2. The steering system of claim 1, further comprising a piston engaged with the steering drive mechanism and a cylinder surrounding the piston, the cylinder including hydraulic ports on opposite sides of the piston for assisting translational movement of the steering drive mechanism.

3. The steering system of claim 1, in combination with the vehicle.

4. A steering system for a vehicle having a solid front axle and a steering column, comprising:

a pinion gear connected to the steering column and rotatable therewith;

a steering drive mechanism including a rack gear meshed with the pinion gear at an engagement segment of the rack gear and a coupling segment moved by the engagement segment;

an arm connected to the coupling segment;

a drag link connected to the arm and coupled to the first front wheel of the vehicle; and a tie rod coupled to the first front wheel and to the second front wheel of the vehicle, whereby rotation of the pinion gear causes the steering drive mechanism and arm to move translationally, thereby moving the drag link to turn the first front wheel, the first front wheel cooperating with the tie rod to simultaneously turn the second front wheel; and a piston engaged with the steering drive mechanism and a cylinder surrounding the piston, the cylinder including hydraulic ports on opposite sides of the piston for assisting translational movement of the steering drive mechanism;

wherein the cylinder includes first and second channels spaced from each other, and the steering drive mechanism further includes first and second guide rails reciprocatingly engaged with the first and second channels, respectively, and with the arm to bear bending moments when the steering drive mechanism is moved.

5. The steering system of claim 4, further comprising a ball joint for coupling the arm to the drag link.

6. The steering system of claim 5, wherein the arm includes a link segment distanced from the coupling segment, the link segment being connected to th drag link.

7. The steering system of claim 6, wherein the arm is disposed near the second front wheel of the vehicle, such that the drag link extends nearly completely across the vehicle to the first front wheel.

8. A vehicle, comprising:

a steering column;

first and second front wheels;

a tie rod interconnecting the wheels, such that when one wheel turns, the other wheel turns;

an elongated drag link defining a wheel end and a mechanism end, the wheel end of the drag link being coupled to the first wheel, the mechanism end of the drag link being disposed near the second wheel;

a steering mechanism coupled to the steering column, the steering mechanism including a rack gear having a pinion end engaged with a pinion gear and a drag link end coupled to the mechanism end of the drag link, such that the steering mechanism is coupled to the wheels only at one end of the steering mechanism, wherein the pinion gear is rotatable by the steering column to turn the wheels;

a coupling segment moved by the rack gear;

an arm connected to the coupling segment and to the drag link, and a piston engaged with the steering drive mechanism and a cylinder surrounding the piston, the cylinder including hydraulic ports on opposite sides of the piston for assisting translational movement of the steering drive mechanism;

wherein the cylinder includes first and second channels spaced from each other, and the steering drive mechanism further includes first and second guide rails reciprocatingly engaged with the first and second channels, respectively, and with the arm to bear bending moments when the steering drive mechanism is moved.

9. The vehicle of claim 8, further comprising a ball joint for coupling the arm to the drag link.

10. The vehicle of claim 9, wherein the arm includes a link segment distanced from the coupling segment, the link segment being connected to the drag link.

* * * * *